Figure 1:
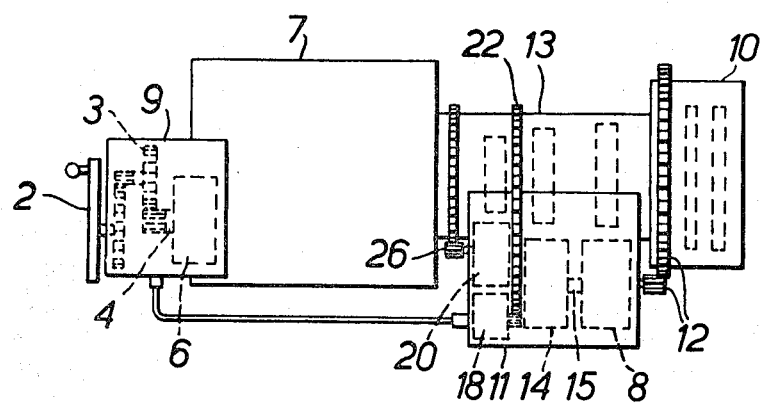

United States Patent

[11] 3,541,941

[72] Inventors John Denzil Barr
Oadby;
Dexter Robert Plummer, Leicester,
England
[21] Appl. No. 750,931
[22] Filed Aug. 7, 1968
[45] Patented Nov. 24, 1970
[73] Assignee The Rank Organisation Limited
London, England
a British company
[32] Priority Aug. 7, 1967
[33] Great Britain
[31] No. 36122/67

[54] CAMERA SYSTEMS
20 Claims, 8 Drawing Figs.
[52] U.S. Cl. .................................................. 95/45
[51] Int. Cl. ............................................... G03b 3/02

[50] Field of Search ........................................... 95/45

[56] References Cited
UNITED STATES PATENTS
3,296,883 1/1967 Plummer ..................... 74/472

Primary Examiner—John M. Horan
Attorney—Holcombe, Wetherill and Brisebois

ABSTRACT: A television or motion picture camera system has an adjustable objective such as a zoom objective and an adjustable iris for varying the mean brightness of an image in the camera. Variable mechanical or electrical transmission means are provided for adjusting the focus setting of the objective in response to a focus demand signal and the effective transmission ratio of said transmission means is variable automatically as a function of the iris aperture setting, and preferably also as a function of the focal length setting, to give constant focus control sensitivity.

Inventors
J. D. BARR
D. R. PLUMMER

By
Holcombe, Wetherill & Brisebois
Attorneys

CAMERA SYSTEMS

SPECIFICATION

This invention relates to the control of a television or motion picture camera and particularly but not exclusively to the control of such a camera having a zoom optical objective of the kind comprising members which are movable for effecting continuous variation of the focal length throughout a range and in which at least a part of the objective is movable to effect focussing in order to suit varying distances between a subject under view and the camera. Movement of the various parts of the objective, respectively to produce variations in focal length and focus setting, is generally independently provided by driving units which form part of preferably separate electrical, mechanical or hydraulic control systems, for example electric servo systems. These control systems respectively operate in response to focal length, and focus demand units which are generally manually controlled by a camera operator but which may be automatically controlled from a preset storage unit in the case where manual control is at least partly dispensed with. In the case of a camera having a standard fixed focal length objective, control of focal length is not included.

A zoom or standard objective of the kind specified also includes a variable iris, which is arranged to vary the relative aperture of the objective and thereby to vary the mean brightness of an image or part of an image formed at an image plane within the camera. The iris also is operated by a driving unit which may be responsive to an aperture demand unit or may be automatically operated. The iris may of course be directly manually operated.

In such objectives, the depth of field varies with the aperture setting of the iris, the greatest depth of field being provided with the iris stopped well down to a high relative aperture; with the iris opened to a low relative aperture, the depth of field is correspondingly considerably reduced. This depth of field variation with relative aperture produces great disadvantages in the camera system hereinbefore described, in that an operator will experience considerable difficulty in adjusting the focus demand unit, the sensitivity of which, that is to say, the demand necessary to produce a given change of focus correction, will vary considerably with iris aperture. Indeed with a standard zoom objective as used in conjunction with television camera the sensitivity of the focus demand unit may vary by a factor of 4 to 1 or more as the relative aperture of the iris varies between f4 and f16.

According to one aspect of the present invention therefore, a television or motion picture camera system comprises a camera having an objective capable of producing a sharp image at an image plane within the camera for different subject distances from the camera, together with an iris effective to vary the mean brightness of a said image, and variable transmission means effective to move at least one part of the objective which produces a change in the focus setting in response to a focus demand signal, the effective transmission ratio of said transmission means being variable as a function of the relative aperture setting of the iris, whereby to maintain a substantially constant focus control sensitivity irrespective of iris aperture.

Conveniently the variable transmission means include a variable output element, for example, a variable impedance element which is coupled to the iris actuating mechanism of the camera or objective and is in a general sense effective directly or indirectly to modify the extent of movement of a driving unit which produces focussing movement of the appropriate part or parts of the objective as a function of the relative aperture setting of the iris for a given demand.

In a particular case, where an actuator is used to move the parts of the objective, the power input to the actuator for a focus demand signal will depend upon the relative aperture setting. However any device, such as a Hall multiplier capable of producing a variable output in response to a control signal can be used in the variable transmission means.

The invention may be applied to a camera having a zoom objective of the kind capable of producing a continuous variation of focal length within a range as well as producing a change in the focus setting to maintain a subject in sharp focus at the image plane within the camera.

It has been found in this case that the focus sensitivity of such a zoom objective to a given focus demand also is dependant upon the focal length or zoom setting of the objective. Accordingly, according to preferred aspect of the present invention, the variable transmission means effective to produce changes in the focus setting of the objective from a focus demand unit, are arranged partly to be responsive to the focal length setting, namely the zoom setting, of the objective and partly to the relative aperture setting of the iris. In this preferred aspect of the invention, the variable transmission means preferably also include a further variable output element, for example, a variable impedance element or like device which is coupled to the focus-changing mechanism of the objective and also partly is effective directly or indirectly to modify the power input to a driving unit controlling the focus setting of the objective as a function of the focal length setting of the objective. It will be appreciated that the variable transmission means may be required to have different responses to signals respectively representative of the focal length setting and the iris setting of the objective in the case where focus sensitivity is not equally dependant upon the changes in iris aperture and zoom position at corresponding portions of their respective ranges. Such a variable response can be produced by any means well known in the art; for example in the case where the variable output elements respectively are used to control the power input to the focus control driving unit as a function of focal length setting and iris aperture setting, these variable output elements can comprise impedances of suitably graded values or may be connected in series with fixed impedance elements also graded to produce the desired relative transmission dependance or response.

While any open-loop electrical, mechanical or hydraulic transmission control system may be used to effect focussing of the zoom objective in response to a given demand, a preferred transmission system according to the present invention utilises a suitable closed-loop servosystem to achieve better control, the focus demand signal being preferably derived from a focus demand unit. In this case the focus demand unit conveniently is a rate responsive device, and the focus setting of the objective is controlled by a reversible motor which has its output shaft positively coupled to a further rate responsive device and which is driven from a source responsive to the difference between the outputs of the devices so that the motor rotates with the demand unit. Alternatively, the focus demand signal may comprise an error signal derived from an autofocussing unit which is effective to maintain a subject in sharp focus automatically.

In such a servo transmission system, two independent variable output elements respectively coupled to the focus-changing mechanism of the objective and the iris actuating mechanism of the camera or the objective, may be used to modify the outputs from either of the rate-responsive devices in a selected ratio. Alternatively both the variable output elements can be used to modify the output from one of the devices only or each of them may be used to vary the output from one of the devices. The system preferably is an electrical system.

In the case where the rate responsive devices are, for example, excited tachometer generators or other separately excited devices, the variable output elements may be used to modify the excitation of one or more of these devices as a function respectively of the focal length setting of the zoom objective and the relative aperture setting of the objective iris.

Conveniently each variable output element is a potentiometer having a slider coupled to move with the focus-changing mechanism or the iris actuating mechanism of the objective or camera as appropriate.

In an alternative embodiment of the invention, the focus driving unit is hydraulically powered by way of valve control means well known in the art whose transmission ratio is varied as a function of the focal length and of the relative aperture setting of the iris.

The focus driving unit may also be powered by a series of pulses derived from a source controlled by the demand unit and producing a pulse repetition rate which is a function of the focus setting of the objective and/or the relative aperture setting of the iris, so that the rate of operation of the focus driving unit is dependent upon the focus and aperture setting of the objective as well as upon the focus demand.

With the arrangement of the invention, the apparent focussing sensitivity of the zoom objective for a given demand may be maintained substantially constant throughout the range of variation of focal length of the objective or indeed the magnification of the camera objective combination, as well as relative aperture range of the objective aid. It will be appreciated that variable magnification can be obtained by varying the effective focal length of the zoom objective and/or by varying the effective focal length of the zoom objective and/or by varying the effective magnification in the camera output where the camera is a television camera.

It has been found with certain camera arrangement in which a closed-loop servosystem is used for focussing control, that limitations in the servo response speed make it impossible to compensate for relatively large variation in focus sensitivity which are produced by variations of iris aperture at short objective focal lengths. In this case the system is arranged so that compensation for iris setting is not affected at low focal length settings of the zoom objective.

Compensation of focus for iris setting is not used at wide-angle fields of view because a very large depth of field is then available, outweighting the variations due to iris setting.

Embodiments of the invention will now be particularly described by way of example with reference to the accompanying drawing in which:

FIG. 1. is a diagramatic representation of a television camera including a zoom objective and having a servofocus control system.

Figure 2:
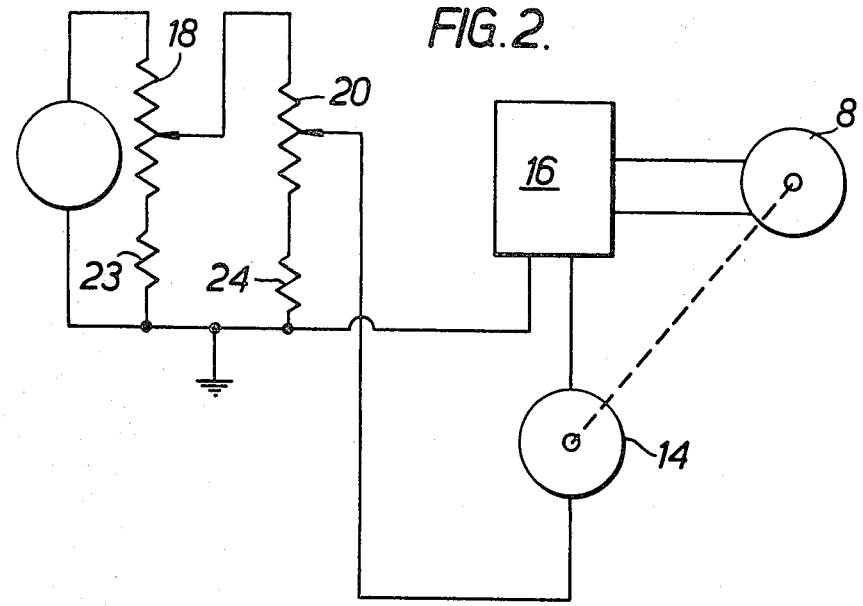

FIG. 2. is a schematic circuit diagram of a servosystem producing focus control of the zoom objective of FIG. 1.

Figure 3:
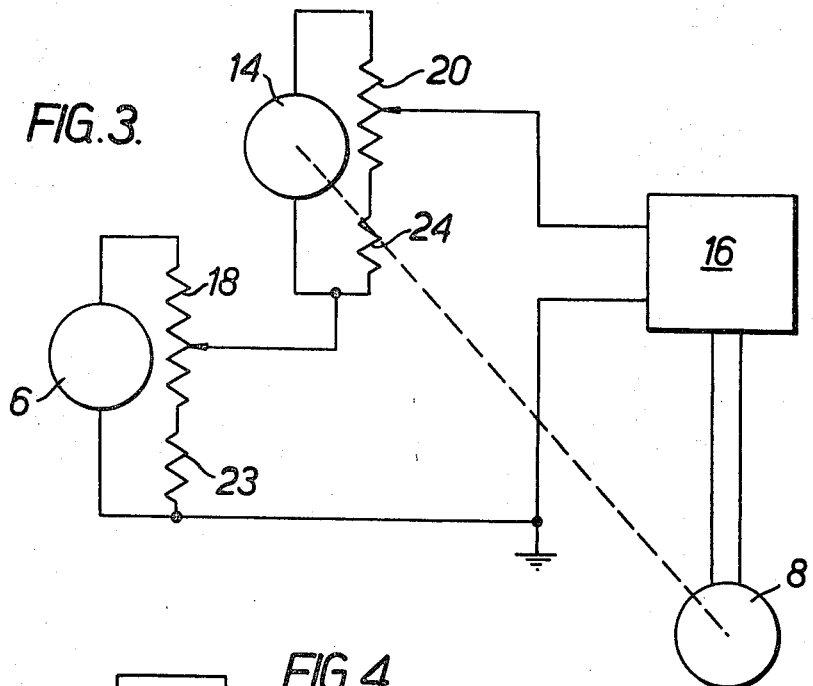
Figure 4:
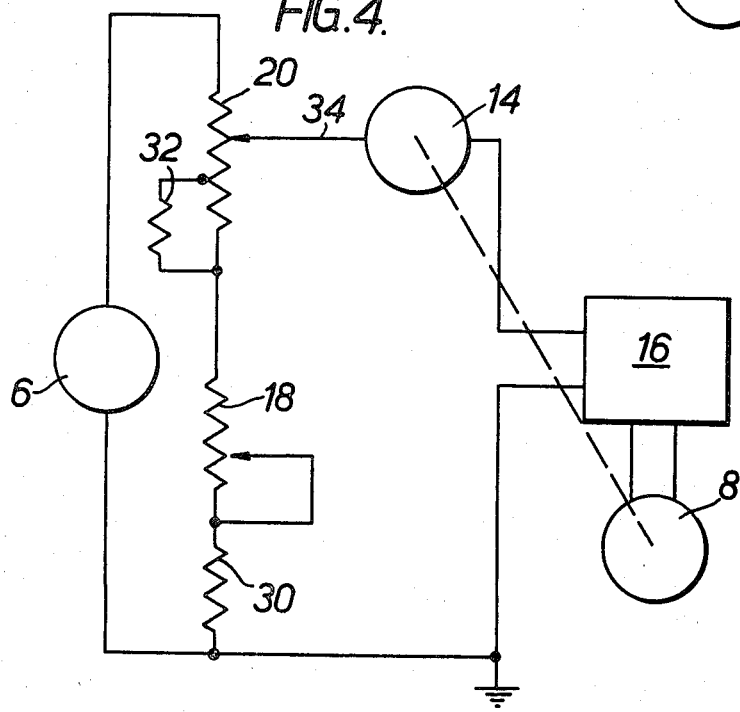

FIG. 3. is an alternative electrical servosystem to that shown in FIG. 2 and;

FIG. 4. is a further alternative to the circuits of FIGS. 2 and 3.

Figure 5:
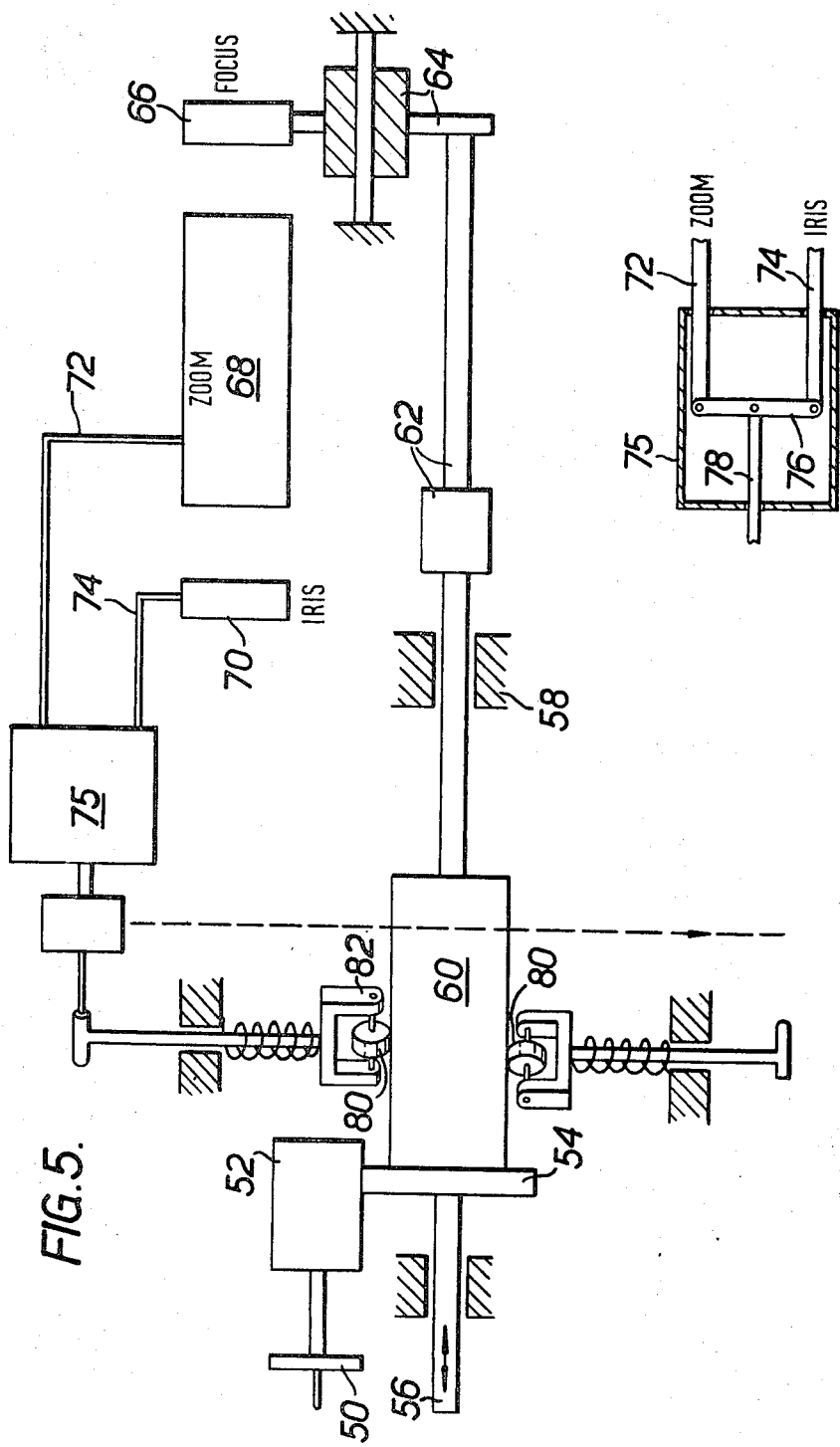

FIG. 5. is a schematic diagram of a mechanical control system.

Figure 6:
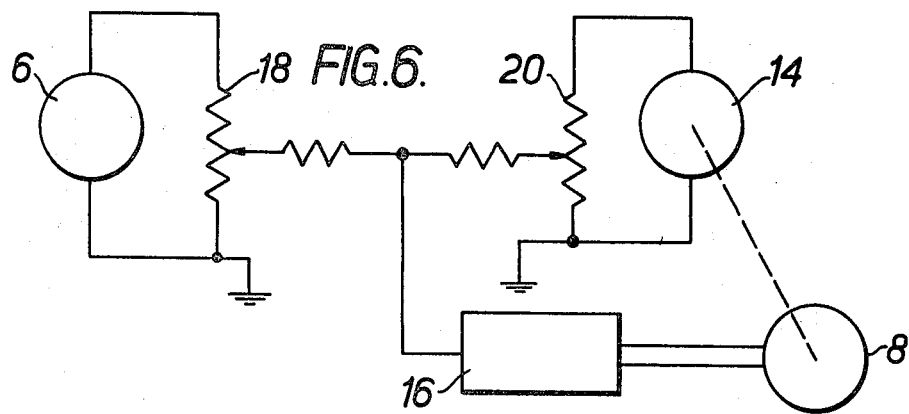

FIG. 6. is a schematic diagram showing means for compensating the response of the focussing motor.

Figure 7:
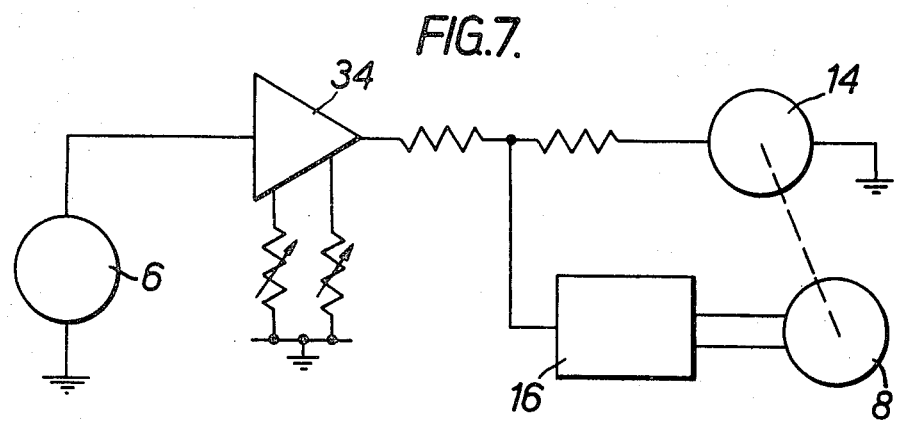

FIG. 7. shows an alternative to the circuit of FIG. 6.

Figure 8:
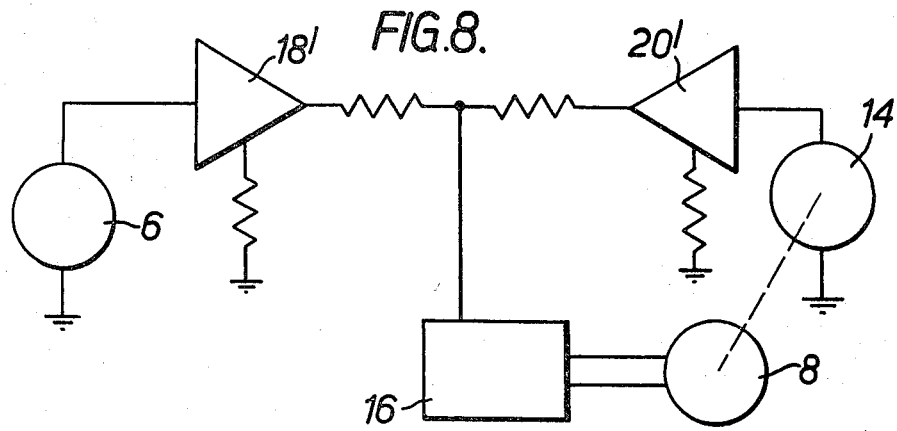

FIG. 8. shows a further alternative to the circuit of FIG. 6.

Referring to the drawings, the focus demand unit includes a manually operated handwheel 2 which is coupled through gearing 3 to the input shaft 4 of a tachometer generator 6 in order to drive this tacho-generator at a considerably faster rate than that of the handwheel 2. Tacho-generator 6 and the associated gearing 3 conveniently are accommodated in a small housing 9 on the side of the camera which is indicated generally at 7. The gearing may of course be arranged in various ways other than shown and may if desired be replaced by a suitable friction drive of a type well known in the art.

The output of the tacho-generator 6 is proportional in sense and in magnitude to the direction and to the rate of movement of the handwheel 2 and therefore to the direction and to the rate of the focus change demanded by the camera operator. The output from the tacho-generator 6 is fed to an electrical servodevice contained in a small housing also disposed at the side of the camera and indicated generally at 11.

The servodevice in housing 11 comprises a reversible electric motor 8 having suitable torque-speed characteristics. The motor 8 has its output shaft positively mechanically coupled to the focus portion 10 of the camera zoom objective by way of gearing 12 and to a second tachometer generator 14 by way of a mechanical coupling indicated generally at 15. This tachogenerator 14 also is effective to produce an electric output signal proportional in sense and in magnitude respectively to the direction and to the rate of revolution of the driving motor 8.

The driving motor 8 is powered by being connected to the output of a multistage high gain amplifier 16 (see FIG. 2) which is sensitive to the algebraic difference between signals respectively derived from the tacho-generators 6 and 14 by way of signal modifying potentiometers 18 and 20.

Potentiometer 18 is connected by way of gearing 22 to the mechanism effective to vary the relative aperture of an iris (not shown) which forms a part of the zoom objective indicated generally at 13 and which is effective to control the mean brightness, at the image plane within the camera, of the image of a subject or part of a subject under view.

In one possible arrangement, the gearing 22 controls the slider of the potentiometer 18 so that the output thereof, compared to its input is a function of the relative aperture of the objective iris. It will be appreciated, however, that the slider may be stationary while the body of the potentiometer containing the potentiometer track is movable by the mechanism. This latter arrangement, however, involves the use of flexible flying leads to the potentiometer terminals in order to allow free rotation of the body of the potentiometer. The iris may of course be provided upon the camera per se, rather than upon the objective per se.

Potentiometer 18 is electrically connected by way of a series resistor 23, across the output of the demand tacho-generator 6 so that the focus demand applied to the servosystem by way of the slider of potentiometer 18 is a function of the relative aperture of the iris for a given demand. The output from potentiometer 18 is then applied to the series combination of potentiometer 20 and resistor 24 connected substantially in shunt with the combination of potentiometer 18 and resistor 23.

Potentiometer 20 also is positively coupled by way of gearing 26 to the mechanism producing movement of the zooming elements along the optical axis of the objective. The output of potentiometer 20 compared to its input will, as previously, be a function of the focal length setting of the objective, the dependence law being determined as required by the resistance characteristics of the potentiometer track.

The output of potentiometer 20 is applied by way of tacho-generator 14 to the input of amplifier 16. The input of amplifier 16 will accordingly be the algebraic difference between the output of tacho-generator 6 as modified by the two series networks respectively including potentiometers 18 and 20, and the unmodified output of tacho-generator 14.

It will be appreciated, however, that the output of tacho-generator 14 and/or tacho-generator 6 could be modified by potentiometers or other variable output elements to produce the desired results.

In use of the apparatus, the motor 8 will rotate at a rate determined by the amplitude of the difference signal at the amplifier input and in a direction determined by the sense of this input. This difference signal will be a function of the output of the demand tacho-generator 6 as modified by the potentiometers 18 and 20 so that the response of the focussing motor 8 to a focus demand applied to the operating handle 2 will be a function of the focal length setting of the objective and of the relative aperture of the iris thereof.

By the use of this transmission system the sensitivity of the focus control to a given demand at various settings of objective focal length and relative aperture can thus be made substantially constant by a suitable choice of potentiometers 18 and 20. Resistors 23 and 24 have values graded to ensure the required relative signal modifying effect of potentiometers 18 and 20. The substantially constant focus control sensitivity obtained has considerable advantage to the operator who can produce a substantially constant change of focus for the same demand applied to the handwheel 2 irrespective of focal length setting and iris setting of the objective. This is particularly important when regard is had to the fact that the operator also has to control the panning and tilting of the camera, with possibly also height control, as well as operating the zoom and the iris demand elements. The substantially constant focus sensitivity thus means that the operator has two variable parameters less to take into account and this enables significantly easier camera control to be obtained. Considering the complexity and the high degree of skill required to operate such a camera with such controls this advantage is significant, particularly so if changes in the parameters are automatically effected from a preset store.

In most cases, the resistance characteristics of the potentiometer tracks are nonlinear; such nonlinear track characteristics can be obtained by any means well known in the art, for example shaped film potentiometer tracks, cam operated sliders or suitably tapped linear tracks.

The law of potentiometer 18, compensating focus sensitivity for iris setting will in most cases be different from that of potentiometer 20, compensating for zoom setting. For practical considerations these potentiometers are arranged to produce a transmission ratio giving optimum focus sensitivity within the range close to maximum focal length and for high relative aperture. This is because at the region of short focal length, focussing is no longer particularly critical and compensation is therefore no longer as absolutely necessary as when the depth of focus is small and focussing is correspondingly more critical.

An alternative embodiment of the servosystem of FIG. 2 is shown in FIG. 3. In this embodiment the output from the tachometer generator 6 is passed directly to the input of amplifier 16 by way of the sequential arrangement of the series combination comprising the potentiometers 18 and 20 with their respective equalising resistors 23, 24.

In the embodiment of FIG. 4 the iris compensating potentiometer 18 and the zoom compensating potentiometer 20 are connected in series with a resistor 30, this combination being connected across the demand tachometer generator 6. The output from the tachometer generator 6 as modified by the potentiometers 18 and 20 and derived from the slider of potentiometer 18, is applied to the input of amplifier 16 by way of the reset tachometer generator 14 as in the embodiment of FIG. 1.

In this arrangement of FIG. 4, the iris compensating potentiometer is, in effect, active to modify the level of excitation of the zoom compensating potentiometer 20 as a function of the relative aperture of the objective iris.

The potentiometer 20 is partially shunted by a resistor 32 to provide a nonlinear characteristic.

It will also be appreciated that the means whereby compensation of the response of the focussing motor 8 for the focal length setting of the objective and the relative aperture thereof may be effected in a variety of ways. For example, the potentiometers 18 and 20 may be connected independently across the outputs of the respective tacho-generators 6 and 14, and the outputs from the two potentiometers combined in the amplifier 16, as illustrated diagrammatically in FIG. 6. In FIG. 6 the positions of the potentiometers 18 and 20 can be interchanged.

A further alternative arrangement is illustrated diagrammatically in FIG. 7. The output from the demand tachogenerator is passed directly to the input of the amplifier 16 through an amplifier 34 which includes respective automatic gain control circuits effective to adjust the gain of the amplifier 34 automatically independence on the focal length setting of the camera zoom elements and on the relative aperture setting of the iris respectively. The automatic gain control circuits may employ nonlinear elements or potentiometers, such as the potentiometers 18, 20 described previously, for adjusting the amplifier feedback ratio.

Similarly, the potentiometers 18 and 20 in the embodiment of FIG. 6 may be replaced by other variable output elements such as respective amplifiers 18¹, 20¹, as shown in FIG. 8, having means (for example nonlinear elements or potentiometers) for controlling gain automatically in accordance with the relative aperture and focal length settings respectively.

In a further alternative embodiment, the tachometer generators 8, 14 may be separately excited, the degree of excitation being varied to effect the desired compensation. A mechanical embodiment of the invention is schematically shown in FIG. 5.

In this embodiment, the focus demand unit comprises a rotatable demand handle 50 positively coupled to a right cylindrical member 52, the periphery of which engages with the periphery of a wheel 54. Wheel 54 is supported by way of an axle 56 slidably movable within sleeves 58, to permit rotation as well as axial movement thereof and the engaging surfaces of the wheel 54 and the drive cylinder 52 are accordingly suitably treated to produce positive movement of both kinds.

Wheel 54 is in turn secured to a cylinder 60 which is axially and rotatably movable with wheel 54 and is secured to a coupling and a mechanism respectively indicated generally at 62 and 64 together capable of producing movement of that portion of the zoom objective effective to produce a change in focus setting.

The zoom portion 68 of the objective and the iris 70 are coupled by way of their actuating mechanisms (not shown) and couplings shown generally at 72 and 74, to a mechanism 75 which combines the zoom and iris settings in a known manner, for example a differential mechanism whose output is dependent on the difference in the zoom and iris setting. The differential mechanism may comprise a simple mechanism including a lever 76, wherein a zoom position is applied to one end of lever 76 and iris position is applied to the other end of the lever. An output taken from a suitable point 80 between the ends of the lever (not necessarily the midpoint thereof) is transmitted by way of coupling 78 to produce a signal representative of the differential between iris and zoom settings.

The couplings to the lever 76 need not be in the position shown, nor indeed need the differential mechanism be a lever. A suitable gearbox or other mechanism well known in the art is equally suitable.

The output signal transmitted from the differential mechanism 75 is arranged, by a suitable means well known in the art, to control the skew angle subtended between the axis of rotation of freely rotatable rollers 80 held in yokes 82 and biased into frictional contact with the cylinder 60.

As the cylinder 60 rotates in response to a demand applied to handle 50, frictional engagement with the rollers 80 will cause it also to move axially at a rate determined by the skew angle, the relation between the skew angle and the axial movement of the cylinder 60 being a tangent relationship. Clearly the rate of axial movement increases as the skew angle increases and therefore as the differential between the zoom and iris settings of the objective increases.

The variation of the skew angle of the rollers 80 also causes the torque required to move the demand handle 50 to vary. For skew angles greater than about 20° a substantially nonlinear (i.e. tangential) compensation of focus is achieved.

Since axial movement only of cylinder 60 produced from a given focus demand, determines the amount of focus change applied to the objective, the sensitivity of the focus demand unit will, as in the previous embodiments, be a function of these settings and can be suitable design be rendered substantially constant and independent of these settings.

It will be appreciated that in the electrical or mechanical cases, the focus sensitivity can be made dependent upon iris setting only.

We claim:
1. A camera system comprising, in combination:
 a. a camera having an internal image plane at which images are formed;
 b. an objective mounted on said camera and having a movable part capable of producing a sharp image of a subject at said image plane for different subject distances from the camera;

c. a focus driving unit operatively connected to said movable part and effective to produce focussing movement thereof;

d. an adjustable iris;

e. an iris actuating mechanism effective to control the relative aperture setting of the iris and thereby the mean brightness of the image in the camera;

f. means providing a focus demand signal;

g. variable transmission means effective to adjust the objective to produce a change in the focus setting thereof in response to a said focus demand signal; and h. means sensitive to the relative aperture setting of the iris automatically to adjust the transmission ratio of said transmission means as a function of said iris aperture, whereby to maintain a substantially constant focus control sensitivity irrespective of iris aperture.

2. A camera system according to claim 1, wherein the variable transmission means include a variable output element which is coupled to the iris actuating mechanism of the camera or of the objective and which is effective for given demand to modify the extent of movement of the focus driving unit as a function of iris aperture.

3. A camera system according to claim 1 wherein the variable transmission means are arranged partly to be responsive to the focal length setting of the objective, and partly to the aperture setting of the iris whereby to produce substantially constant focus control sensitivity, irrespective of focal length or aperture.

4. A camera system according to claim 3, wherein a further variable output element coupled to the focal length changing mechanism of the objective is arranged partly to modify the power input to the driving unit controlling the focus setting of the objective as a function of the focal length setting of the objective.

5. A camera system according to claim 2, wherein the variable output element comprises a variable impedance device such as a graded impedance and a series graded fixed impedance element which ensures the correct relative sensitivity of the variable transmission means to the focal length setting and/or the iris aperture setting of the objective.

6. A camera system according to claim 1, including a focus demand unit which provides the focus demand signal.

7. A camera system according to claim 6 wherein the demand unit is a rate-responsive device producing a signal representative of the rate of focus change demanded and the focus setting of the objective and including a reversible motor controlling said rate-responsive device, a further rate-responsive device positively coupled to said motor, and a source responsive to the difference between the outputs of the said devices and driving said rate-responsive device, so that the motor rotates in dynamic equilibrium with the demand unit.

8. A camera system according to claim 7, wherein two independent variable output elements respectively are coupled to the focal length changing mechanism of the objective and the iris actuating mechanism of the camera objective, the outputs of said output elements being used to modify the outputs of at least one of the rate-responsive devices in a selected ratio.

9. A camera system according to claim 8, wherein the system is electrical and the devices respective are tachometer generators or like transducers.

10. A camera system according to claim 1 wherein the variable transmission means comprise a variable mechanical transmission.

11. A camera system according to claim 8, wherein a potentiometer having a slider coupled to the iris actuating mechanism, and constituting a said variable output element, is arranged to modify the signal from at least one of the rate-responsive devices as a function of the aperture setting of the iris, so that the rotation rate of the motor for a given demand is a function of this aperture setting.

12. A camera system according to claim 11, wherein a further potentiometer having a slider coupled to the movable part of the objective and constituting the other variable output elements, is connected into circuit with the potentiometer cooperating with the iris, whereby both potentiometers are effective to modify the output of at least one of the rate-responsive devices as a function both of the iris and focal length setting of the objective.

13. A camera system according to claim 12, wherein the potentiometers are connected in series circuit.

14. A camera system according to claim 12, wherein the potentiometers are connected in parallel circuit.

15. A camera system according to claim 1, wherein the focus driving unit is hydraulically powered and wherein the variable transmission means include control valves effective to vary the power input to the driving unit.

16. A camera system according to claim 1 including a source controlled by the demand signal and providing a series of pulses having a pulse repetition rate which is a function of the focal length setting of the objective and/or of the aperture setting of the iris, said focus driving unit being powered by the said pulses so that the rate of operation of the focus driving unit is dependent upon the focus and/or upon the aperture setting of the objective as well as upon the focus demand.

17. A camera system according to claim 1, wherein the objective is a zoom objective producing a continuous variation of focal length within a selected range.

18. A camera system according to claim 1, including an autofocussing unit effective to maintain a subject in focus automatically and providing an error signal constituting said demand signal.

19. A camera system according to claim 1, wherein the camera is a television camera.

20. A camera system according to claim 1, wherein the camera is a motion picture camera.